(12) United States Patent
Mour et al.

(10) Patent No.: US 11,972,224 B2
(45) Date of Patent: Apr. 30, 2024

(54) MODEL MAPPING AND ENRICHMENT SYSTEM

(71) Applicant: SAP SE, Walldorf (DE)

(72) Inventors: Vishal Mour, Guwahati (IN); Sreya Dey, Banagalore (IN); Shipra Jain, Bangalore (IN); Rahul Lodhe, Bangalore (IN)

(73) Assignee: SAP SE, Walldorf (DE)

( * ) Notice: Subject to any disclaimer, the term of this patent is extended or adjusted under 35 U.S.C. 154(b) by 290 days.

(21) Appl. No.: 17/364,988

(22) Filed: Jul. 1, 2021

(65) Prior Publication Data
US 2023/0004728 A1    Jan. 5, 2023

(51) Int. Cl.
| | | |
|---|---|---|
| G06F 40/44 | (2020.01) | |
| G06F 40/47 | (2020.01) | |
| G06N 5/04 | (2023.01) | |
| G06N 20/00 | (2019.01) | |

(52) U.S. Cl.
CPC .............. *G06F 40/44* (2020.01); *G06F 40/47* (2020.01); *G06N 5/04* (2013.01); *G06N 20/00* (2019.01)

(58) Field of Classification Search
CPC .......... G06N 20/00; G06F 40/44; G06F 40/47
See application file for complete search history.

(56) References Cited

U.S. PATENT DOCUMENTS

| | | | | |
|---|---|---|---|---|
| 10,523,682 | B1 * | 12/2019 | Badawy ................ | H04L 63/104 |
| 11,176,471 | B1 * | 11/2021 | DeCaprio ........... | G06F 18/2115 |
| 2019/0362353 | A1 * | 11/2019 | Patten, Jr. .............. | G06N 5/022 |
| 2019/0378210 | A1 * | 12/2019 | Merrill ...................... | G06N 5/01 |
| 2020/0134484 | A1 * | 4/2020 | Hazard .................. | G06N 20/00 |
| 2021/0049503 | A1 * | 2/2021 | Nourian .............. | G06F 11/3466 |
| 2021/0142190 | A1 * | 5/2021 | Isahagian ................. | G06N 5/04 |
| 2021/0142253 | A1 * | 5/2021 | Cohen ................ | G06Q 30/0202 |
| 2021/0192376 | A1 * | 6/2021 | Sarferaz .................. | G06F 40/40 |
| 2021/0304061 | A1 * | 9/2021 | Kolar .................. | G06F 11/3447 |
| 2022/0245502 | A1 * | 8/2022 | Isahagian ............. | G06F 18/2415 |
| 2023/0004728 | A1 * | 1/2023 | Mour ...................... | G06F 40/47 |

OTHER PUBLICATIONS

Asthana et al. "Human-in-the-Loop Business Modelling for Emergent External Factors." 2020 IEEE International Conference on Big Data (Big Data). IEEE (Year: 2020).*

(Continued)

*Primary Examiner* — Samuel G Neway
(74) *Attorney, Agent, or Firm* — Sterne, Kessler, Goldstein & Fox P.L.L.C.

(57) ABSTRACT

Disclosed herein are various embodiments for training and enriching a natural language processing system. An embodiment operates by determining that a first prediction from a first machine model has been generated based on a dataset comprising a plurality of attributes. A technical map identifying a first subset of attributes of the plurality of attributes used to generate the first prediction by the first machine model is generated. Natural language translations corresponding to at least a portion of the first subset of attributes used to generate the first prediction by the first machine model are identified. A natural language map of the first subset of attributes is generated based on the natural language translations. The natural language map is provided with the first prediction.

20 Claims, 9 Drawing Sheets

(56) References Cited

OTHER PUBLICATIONS

Lampathaki et al. "Moving from 'black box' to 'glass box' Artificial Intelligence in Manufacturing with Xmanai." 2021 IEEE International Conference on Engineering, Technology and Innovation (ICE/ITMC). IEEE (Year: 2021).*

Mour, Vishal, et al. "Feature store for enhanced explainability in support ticket classification." Natural Language Processing and Chinese Computing: 9th CCF International Conference, NLPCC 2020, Zhengzhou, China, Oct. 14-18, 2020, Proceedings, Part II 9. Springer International Publishing (Year: 2020).*

Bareiss, E.R. et al., "PROTOS: An Exemplar-Based Learning Apprentice," from *Machine Learning Volume III*, pp. 112-139, ISBN No. 1-55860-119-9, Morgan Kaufmann Publishers, Inc., Copyright 1990.

Brown, J.S. et al., "Pedagogical, natural language and knowledge engineering technique in Sophie I, II, and III," from *Intelligent Tutoring Systems,* pp. 227-282, ISBN No. 0-12-648680-8, Academic Press Inc., Copyright 1982.

Fagan, L.M. et al., "Computer-Based Medical Decision Making: From MYCIN to VM," Automedica, vol. 3, pp. 97-106, 1980.

Lundberg, S.M. & Lee, S.I., "A Unified Approach to Interpreting Model Predictions," 31st Conference on Neural Information Processing Systems (NIPS 2017), Long Beach, CA, USA, 10 p. 2017.

Ribeiro, M.T.C. et al., "Lime: Explaining the predictions of any machine learning classifier," https://github.com/marcoter/lime, 6 pages as archived at https://web.archive.org/, Jul. 19, 2020.

Ribeiro, M.T. et al., "Why Should I Trust You? Explaining the Predictions of Any Classifier," arXiv:1602.04938v3 [cs.LG], 10 pages, Aug. 9, 2016.

Tickle, A. B. et al., "The Truth Will Come to Light: Directions and Challenges in Extracting the Knowledge Embedded Within Trained Artificial Neural Networks," IEEE Transactions on Neural Networks, vol. 9, No. 6, pp. 1057-1068, Nov. 1998.

Wang, J et al., "Contextual AI," https://contextual-ai.readthedocs.io/en/latest/, 8 pages, Copyright 2020.

Zak, K. et al., "Support Tickets Classification," https://github.com/karolzak/support-tickets-classification, 21 pages, as archived Sep. 14, 2020 at https://web.archive.org/.

* cited by examiner

| | STCA | DUMO | CRHI | PURP | CRAM | SAAC | PEMS | IPDI | PSAS | ODOG | PRES | PROP | AGEY | OIPL | HOUS | NMCR | JOBC | NMPP | TLPH | FRWR |
|---|---|---|---|---|---|---|---|---|---|---|---|---|---|---|---|---|---|---|---|---|
| 0 | A11 | 6 | A34 | A43 | 1169 | A65 | A75 | 4 | A93 | A101 | 4 | A121 | 67 | A143 | A152 | 2 | A173 | 1 | A192 | A201 |
| 1 | A12 | 48 | A32 | A43 | 5951 | A61 | A73 | 2 | A92 | A101 | 2 | A121 | 22 | A143 | A152 | 1 | A173 | 1 | A191 | A201 |
| 2 | A14 | 12 | A34 | A46 | 2096 | A61 | A74 | 2 | A93 | A101 | 3 | A121 | 49 | A143 | A152 | 1 | A172 | 2 | A191 | A201 |
| 3 | A11 | 42 | A32 | A42 | 7882 | A61 | A74 | 2 | A93 | A103 | 4 | A122 | 45 | A143 | A153 | 1 | A173 | 2 | A191 | A201 |
| 4 | A11 | 24 | A33 | A40 | 4870 | A61 | A73 | 3 | A93 | A101 | 4 | A124 | 53 | A143 | A153 | 2 | A173 | 2 | A191 | A201 |

414A ~ {
  'AGEY' : 'Age in years',
  'CRAM' : 'Credit amount',
  'CRHI' : 'Credit history',
  'DUMO' : 'Duration in month',
  'FRWR' : 'foreign worker',
  'HOUS' : 'Housing',
  'IPDI' : 'Installment rate percentage of disposal income',
  'JOBC' : 'Job',
  'NMCR' : 'Number of existing credits at this bank',
  'NMPP' : 'Number of people being liable to provide maintenance for',
  'ODOG' : 'Other debtors / guarantors',
  'OIPL' : 'Other installment plans',
  'PEMS' : 'Present employment since',
  'PRES' : 'Property',
  'PROP' : 'Personal status and sex',
  'PSAS' : 'Purpose',
  'PURP' : 'Savings account/bonds',
  'SAAC' : 'Status of existing checking account',
  'TLPH' : 'Telephone'
}

FIG. 4A

```
414B
    {('STCA',  'A11') :   '< 0 DM',
     ('STCA',  'A12') :   '0 <= ... < 200 DM',
     ('STCA',  'A13') :   '>= 200 DM / salary assignments for at least 1 year',
     ('STCA',  'A14') :   'no checking account',
     ('CRHI',  'A30') :   'no credits taken/ all credits paid back duly',
     ('CRHI',  'A31') :   'all credits at this bank paid back duly',
     ('CRHI',  'A32') :   'existing credits paid back duly till now',
     ('CRHI',  'A33') :   'delay in paying off in the past,'
     ('CRHI',
     'A34') : 'critical account/ other credits existing (not at this bank)',
     ('PURP',  'A40') :   'car (new)',
     ('PURP',  'A41') :   'car (used)',
     ('PURP',  'A42') :   'furniture/equipment',
     ('PURP',  'A43') :   'radio/television',
     ('PURP',  'A44') :   'domestic appliances',
     ('PURP',  'A45') :   'repairs',
     ('PURP',  'A46') :   'education',
```

FIG. 4B

Raw Global Explanation for Class 0 (Good Credit)

510A

|   | features  | scores    |
|---|-----------|-----------|
| 0 | STCA_A11=0 | 0.0695686 |
| 1 | PURP_A46=0 | 0.0429854 |
| 2 | CRHI_A30=0 | 0.0314804 |
| 3 | STCA_A14=1 | 0.0283836 |
| 4 | STCA_A12=0 | 0.0281351 |

Translated Global Explanation for Class 0 (Good Credit) using XAI Feature Store

516A

|   | features | scores |
|---|----------|--------|
| 0 | "Status of existing checking account" is not "< 0 DM" | 0.0695686 |
| 1 | "Purpose" is not "education" | 0.0429854 |
| 2 | "Credit history" is not "no credits taken/ all credits paid back duly" | 0.0314804 |
| 3 | "Status of existing checking account" is "no checking account" | 0.0283836 |
| 4 | "Status of existing checking account" is not "0 <= ... < 200 DM" | 0.0281351 |

FIG. 5A

Raw Global Explanation for Class 1 (Bad Credit)

| | features | scores |
|---|---|---|
| 0 | STCA_A11=1 | 0.0467087 |
| 1 | STCA_A14=0 | 0.0405912 |
| 2 | HOUS_A152=0 | 0.0233307 |
| 3 | CRAM > 4218.25 | 0.0215198 |
| 4 | RHI_A30=1 | 0.0199745 |

510B

Translated Global Explanation for Class 1 (Bad credit) using XAI Feature Store

| | features | scores |
|---|---|---|
| 0 | "Status of existing checking account" is "< 0 DM" | 0.0467087 |
| 1 | "Status of existing checking account" is not "no checking account" | 0.0405912 |
| 2 | "Housing" is not "own" | 0.0233307 |
| 3 | "Credit amount" > 4218.25 | 0.0215198 |
| 4 | "Credit history" is "no credits taken/ all credits paid back duly" | 0.0199745 |

MODEL MAPPING AND ENRICHMENT SYSTEM

BACKGROUND

Artificial intelligence (AI) and machine learning (ML) models are increasing in use, complexity, and popularity. As an example, a processor may analyze a set of inputs against a model and generate a prediction. The prediction may indicate a recommended action for a user. Because the action may have serious financial, business, or other implications or consequences, for the user to act on the prediction, the user must first trust the model. For a user to trust a model, the user often wants or needs to understand how the model arrived at its prediction. However, a technical breakdown of how the model works with various specific technical variables will often be unhelpful to a non-technical user who is unfamiliar with the technical aspects and specific terminology of the model but who is tasked with acting on the prediction.

BRIEF DESCRIPTION OF THE DRAWINGS

The accompanying drawings are incorporated herein and form a part of the specification.

FIG. 3 is a block diagram illustrating an example dataset, according to some example embodiments.

FIGS. 4A and 4B are block diagrams illustrating an examples of feature stores, according to some example embodiments.

FIGS. 5A and 5B are block diagrams illustrating example functionality related to a model mapping and enrichment system, according to some example embodiments.

In the drawings, like reference numbers generally indicate identical or similar elements. Additionally, generally, the left-most digit(s) of a reference number identifies the drawing in which the reference number first appears.

DETAILED DESCRIPTION

Artificial intelligence (AI) and machine learning (ML) models are increasing in use, complexity, and popularity. As an example, a processor may analyze a set of inputs against a model and generate a prediction. The prediction may indicate a recommended action for a user. Because the action may have serious financial, business, or other implications or consequences, for the user to act on the prediction, the user must first trust the model. For a user to trust a model, the user often wants or needs to understand how the model arrived at its prediction. However, a technical breakdown of how the model works with various specific technical variables will often be unhelpful to a non-technical user who is unfamiliar with the technical aspects and specific terminology of the model but who is tasked with acting on the prediction.

Figure 1:
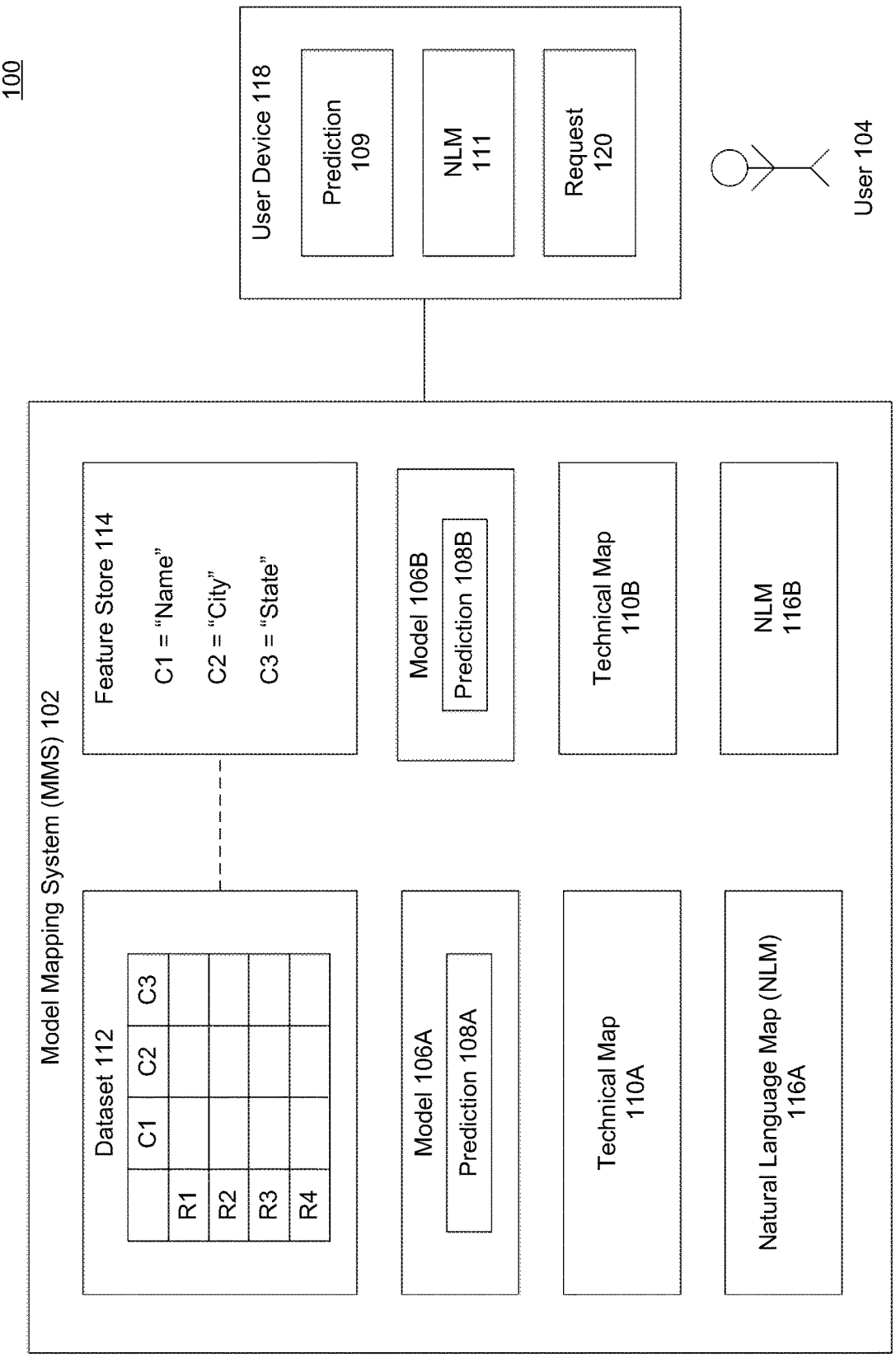
FIG. 1 is a block diagram illustrating functionality for a model mapping and enrichment system, according to some example embodiments.

FIG. 1 is a block diagram 100 illustrating functionality for a model mapping and enrichment system, according to some example embodiments. In some embodiments, a model 106A may generate a prediction 108A that may be provided to a user device 118 (as prediction 109) for a user 104. The user 104 may be tasked with acting on the prediction 109. However, for the user 104 to trust the prediction 109, the user 104 will need to understand how the model 106A generated the prediction 109.

Providing this functionality to help a user understand the prediction 109 becomes increasingly difficult if the user 104 actually represents multiple non-technical users, and there are numerous different models 106A, 106B each providing a variety of predictions 108A, 108B simultaneously to the set of users 104.

This is because models 106A, 106B often operate like black boxes and are very time consuming or even impossible to fully understand. Understanding a model often requires that a person has both technical experience and an already existing understanding of what terminology was used to represent which attributes or variables when the models 106A, 106B were developed. Without this background and experience, it would be impossible for user 104 to understand how a model 106A, 106B reached a prediction 109.

The model mapping system (MMS) 102 may automatically generate natural language maps 116A, 116B that explain how the models 106A, 106B arrived at the predictions 108A, 108B in language that is configured and customized to each user's specific technical or non-technical knowledge and existing skillset. The NLM 111 provided to the users 104 may facilitate understanding, trust, and adoption of the predictions 109 provided by the models 106A, 106B which will save organizations time, money, and resources, and increase profitability.

The MMS 102 may help bridge the gap in understanding for a non-technical user 104 (or a number of different users 104 (not shown)) when using or deciding whether or not to act on a model's prediction 109 by providing an easy to understand NLM 111 providing a non-technical description of how a particular model 106A, 106B arrived at the stated prediction 109.

NLM 111, as generated by MMS 102, will help the user 104 decide whether or not to trust the model 106A, 106B and/or act on prediction 109. NLM 111 may further help the user 104 provide valuable feedback on how the model 106A, 106B may be improved. For example, the model 106A, 106B may generate a prediction 109, if based on NLM 111, the user 104 identifies a factor that was not considered by the model 106A, 106B, this feedback may be used to retrain or update the model 106A, 106B, so as to provide better predictions 109 in the future.

Further, providing an NLM 111 with a prediction 109 may increase the adoption rate of various models 106A, 106B by various users 104 which may help organizations increase revenue, productivity, and customer satisfaction while often also decreasing decrease costs. If a user 104 understands or can see how the model 106A, 106B arrived at prediction 109, the user 104 will be more likely to trust and act on the prediction 109.

In some embodiments, models 106A, 106B (hereinafter collectively referred to as model 106 or models 106) may be artificial intelligence (AI) or machine learning (ML) models. In some embodiments, a model 106 may be trained on a set of training data to make decisions or predictions 108A, 108B without explicitly being programmed to do so.

Prediction 109 represents either prediction 108A or prediction 108B as provided to user device 118 (e.g., mobile device, mobile phone, laptop, Internet of Things (IoT) device, desktop, tablet computer, or other computing device). As used herein, prediction 109 may be used to refer to prediction 108A, prediction 108B, or any or all predictions 108A, 108B generated by different models 106A, 106B.

Based on prediction 109, a user 104 may choose to perform a course of action. The user 104 may act on the prediction 109, or if the user 104 believes the prediction 109 can be improved, the user 104 may also or alternatively provide feedback MMS 102 which may be used to improve the model 106 and its predictive capabilities.

In some embodiments, if a new model 106 is trained or a user 104 has not worked with a particular model 106 before, and the model 106 provides a prediction 109 to user device 118, the user 104 may not yet trust the model 106 and may be hesitant to act on the prediction 109. If the user 104 does not trust the model 106, the user 104 may either ignore, act contrary to the prediction 109, or may waste time and resources redoing their own calculations only to arrive at the same conclusion as prediction 109. No matter the course of action ultimately decided by the user 104, an organization employing the user 104 wastes valuable time, money, productivity, and/or other resources if the user 104 does not understand and trust the models 106 being used to provide a prediction 109.

For the user 104 to trust and act on prediction 109, the user 104 often wants to understand how a model 106 arrived at prediction 109. While there may be technical tools available which can map the inner technical workings of a model 106 to generate a technical map 110 (referring to technical map 110A and/or technical map 110B). This technical map 110 will not be helpful to the non-technical user 104 if the user 104 is not already familiar with both technical terminology used to create or train a model 106 and/or the technical aspects of building and training a model 106. It would be impossible to provide every user 104 with the type of training and knowledge that would be required to understand a technical map 110.

For example, unless user 104 has memorized and is familiar with all the various terminology of how fields and/or data of a dataset 112 are named and their relationships, the technical map 110 will be of little or no use or help to user 104 in understanding how a model 106 arrived at prediction 109, thus will not resolve the issue. It is to be appreciated that the user 104 described herein is not a technical user who is capable of understanding a technical map 110.

To address or bridge the gap in understanding between the technical map 110, which may be automatically generated by a technical mapping tool, and the user's existing non-technical knowledge, MMS 102 may general a natural language map (NLM) 111 (NLM 111 may refer to NLM 116A, NLM 116B, or both NLM 116A and 116B). As will be discussed in greater detail below, NLM 111 may convert technical terminology used in technical map 110 into language and terminology that is understandable by the user 104. NLM 111 provides an understanding of how model 106 arrived at prediction 109 using non-technical terminology. This understanding, though NLM 111, may also better enable user 104 to provide relevant and valuable feedback to improve model 106.

In some embodiments, model 106 may be trained on and/or refer to a dataset 112 in generating prediction 109. Dataset 112 may include one or more tables, columns, or rows of a database or a spreadsheet. Dataset 112 may include training data and/or newly added or real-time data that was used or processed by a model 106 to generate prediction 109. Dataset 112 may be stored or managed across a variety of geographic locations, computing devices, and by a variety of different administrators or data scientists.

A technical tool may use the terminology of dataset 112 to generate a technical map 110. An example technical tool that may be used to generate a technical map is LIME (local interpretable model-agnostic explanations), which may identify which portions, features, factors, or variables of the model 106 and/or dataset 112 that contributed or most contributed to the prediction 109.

MMS 102 may generate a NLM 111 based on the generated technical map 110. In some embodiments, MMS 102 may refer to a feature store 114 in generating NLM 111. Feature store 114 may be table, database, spreadsheet, or other file or group of files that includes translations of the technical terminology, shorthand, and/or codes that exist in dataset 112 that may otherwise be inexplicable or difficult to understand for a user 104 who was not involved in building or designing the dataset 112 and/or training a model 106.

In some embodiments, feature store 114 may be put together by various developers or administrators or other data scientists who are familiar with at least portions of the technical aspects of how data is organized, stored, and/or how models 106 operate. These experts may provide translations or definitions that may be beneficial to various non-technical users 104 who may be trying to understand how a model 106 arrives at prediction 109.

While this process of initially assembling a feature store 114 for a dataset 112 may be both a time and resource intensive process, that may require manual input by the data scientists, MMS 102 allows for the reusability of feature store 114 across various different models 106 that were trained on and/or use or otherwise refer to the same dataset 112 in generating predictions 108A, 108B. The reusability allows MMS to general NLMs 111 for a wide variety users 104 who are received predictions 109 from any number of models 106 referring to, at least in part, the same dataset 112 for which a feature store 114 exists. Furthermore, a single enhancement to an entry of feature store 114 may automatically be applied to all NLMs 116A, 116B across the different models 106A, 106B.

Feature store 114 illustrates an example of a simple feature store 114 in which different values from dataset 112 each correspond to a single word. For example, the various column names C1, C2, and C3 translate to Name, City, and State, respectively. It is understood that a user 104 unfamiliar with the inner workings of a model 106, will not be able to understand C1, C2, C3 as used in a technical map 110, but could understand the terms Name, City, and State as used in a corresponding NLM 111. In other embodiments, feature store 114 may include row and/or data value translations (not shown).

In some embodiments, a single entry in feature store 114 may include multiple definitions, explanations, or translations. The varying translations, or even varying combinations of translations may vary based the model 106A, 106B and/or role/experience/technical understanding of a user 104 for which NLM 111 is being generated.

For example, feature store 114 may include both entry 1 "Name" and entry 2 "Customer Name". Depending on the role of a user 104 to which prediction 109 has been provided, the corresponding NLM 116A for model 106A may include either "Name" or "Customer Name".

Or, for example, feature store 114 may include both entry 1 "Name" and entry 2 "Customer". Then, for example, if NLM 116A is being generated for model 106A, entry 1 may be used in NLM 116A, resulting in "Name". However, if NLM 116B is being generated for model 106B, entry 2+entry 1 may be used in NLM 116B, resulting in "Customer Name".

In some embodiments, the same entries in feature store 114 can be used across different data sets 112. For example, both a first column of a first table and a fourth column of a third table of dataset 112 may refer to or include a pointer to the same "Name" entry in feature store 114. This cross-referencing may save time and resources in both generating, storing, and using feature store 114 for generating NLMs 116A, 116B. One of the advantages of MMS 102 is that feature store 114 may be operable across various different models 106 so that a new feature store 114 does not have to be created for each new model 106A, 106B that is trained or used.

In some embodiments, user 104 may view prediction 109 on user device 118 and may submit a request 120 for NLM 111. Then, for example, upon receiving the request 120, MMS 102 may identify the role/experience of user 104, generate or retrieve a technical map 110, and generate and output a corresponding NLM 111 based on the entries in feature store 114.

Figure 2:
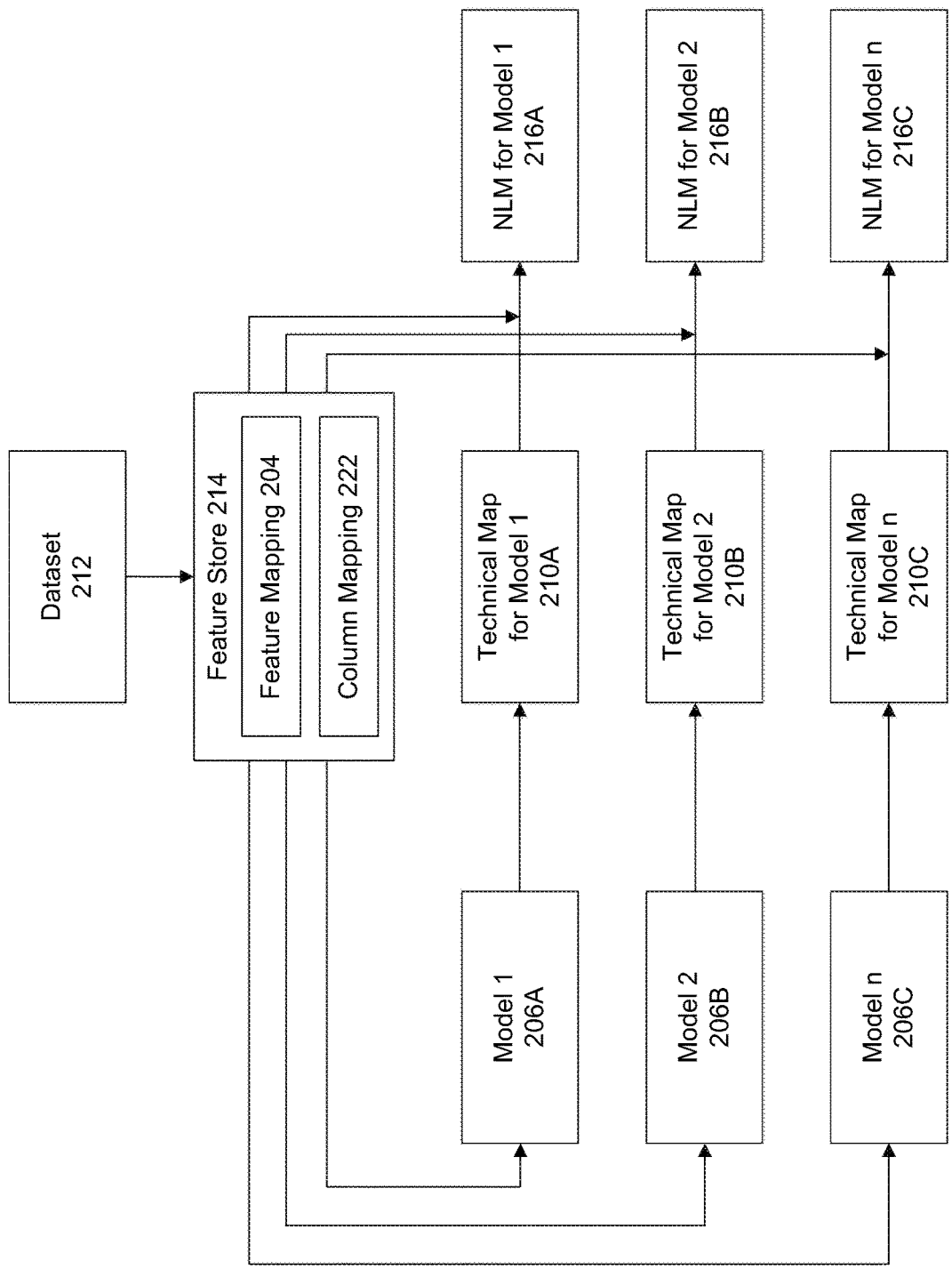
FIG. 2 is another block diagram illustrating example operations of a model mapping and enrichment system, according to some additional example embodiments.

FIG. 2 is another block diagram 200 illustrating example operations of a model mapping and enrichment system, according to some additional example embodiments. FIG. 2 illustrates how the same feature store 214 for a dataset 212 may be used across any different number of models 206A, 206B, 206C to generate corresponding NLMs 216A, 216B, 216C from technical maps 210A, 210B, 210C for a variety of users with different technical understandings or roles (not shown).

Column mapping 202 may refer to performing a mapping of column names to entries in feature store 214 (as illustrated in FIG. 1). Feature mapping may refer to performing a mapping of row or column entries to corresponding entries in feature store 214. For example, the city value "Alexandria" may be referred to as "A1" in dataset 212. Then, in generating an NLMs 216A, 216B and 216C, "A1" in the corresponding technical maps 210A, 210B, and 210C may be replaced with "Alexandria" as identified from feature store 214. This is an extension of reusability of feature store 214 as described above.

FIG. 3 is a block diagram illustrating an example dataset 312, according to some example embodiments. As can be seen in the example dataset 312, unless a user was involved in deciding the shorthand or codes of the column names or field/data values, or has otherwise memorized them (which may impossible because there may be billions of values or codes), providing a non-technical user a description that a model relied on OIPL or value A93 in generating a prediction 109 will not be beneficial to a user in understanding how a model relying on dataset 312 arrived at its prediction.

FIGS. 4A and 4B are block diagrams illustrating an examples of feature stores 414A, 414B, according to some example embodiments. FIG. 4A illustrates an example column mapping feature store 414A. As illustrated, the column mapping feature store 414A includes descriptions or translations of the various column names of the dataset 312 (of FIG. 3). For example, the column name CRAM includes the translation or description "credit amount." Then, for example, if CRAM was used in technical map 110, "credit amount" would be used in corresponding natural language map 116.

FIG. 4B illustrates an example feature or data mapping feature store 414A. As illustrated, the data mapping feature store 414A includes descriptions or translations of the various data value codes or shorthand of the dataset 312 (of FIG. 3).

In some embodiments, data mapping feature store 414A may include both the column id/name/code/shorthand and its corresponding data value entry (e.g., "CHRI", "A32"). So for the column CHRI, if the code A32 is in a record or row, the value A32 is replaced with "existing credits paid back duly till now". This dual level of specificity allows the same data code to be reused across different columns while corresponding to different values. For example, a different column may include the same data code A32 which may correspond to the value "New York City".

In some embodiments, each data code may have its own entry in data mapping feature store 414B and may be column agnostic. For example, data mapping feature store 414B may include the A value codes without the corresponding column names or column codes. Or, in some embodiments, the data codes may correspond to particular tables in data mapping feature store 414B. So, for example, data mapping feature store 414B may include a table name (in addition to or instead of column name) and a corresponding data code or data value, and the same data code may have different entries or values in different tables.

FIGS. 5A and 5B are block diagrams illustrating example functionality related to a model mapping and enrichment system, according to some example embodiments. In FIG. 5A, MMS 102 may generate or retrieve a technical map 510A for a model 106 relying on dataset 312 (of FIG. 3). As may be seen, the technical map includes various impossible to comprehend codes corresponding to various values of dataset 312 and their relative scores or weights in producing a particular prediction (Good Credit).

A non-technical user would not find the information of technical map 510A beneficial when trying to understand or improve a model 106. MMS 102 may then generate natural language map 516A using feature stores 414A and 414B. The natural language map 516A would then reveal to the non-technical user how the corresponding model 106 generated the Good Credit prediction. FIG. 5B is similar to FIG. 5A, except that it illustrates a technical map 510B and a corresponding natural language map 516B for a Bad Credit prediction.

Figure 6:
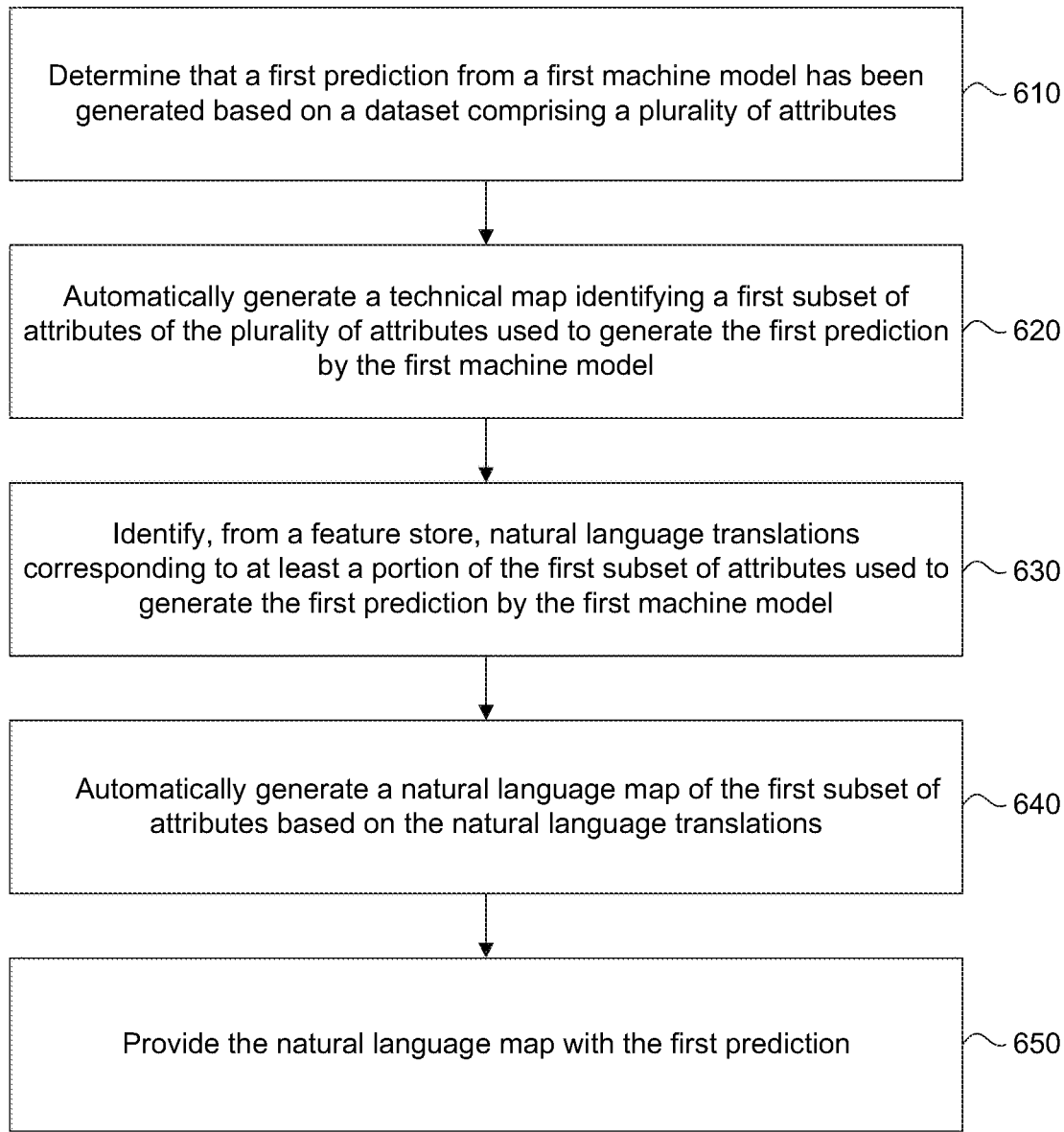
FIG. 6 is a flowchart illustrating example operations for functionality related to a model mapping and enrichment system, according to some embodiments.

FIG. 6 is a flowchart 600 illustrating example operations for functionality related to a model mapping and enrichment system, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art. Method 600 shall be described with reference to the figures.

In 610, it is determined that a first prediction from a first machine model has been generated based on a dataset comprising a plurality of attributes. For example, user 104 may receive a display of prediction 109 on user device 118. Prediction 109 may correspond to prediction 108A generated by model 106A based on dataset 112.

In 620, a technical map is generated, the technical map identifying a first subset of attributes of the plurality of attributes used to generate the first prediction by the first machine model. For example, MMS 102 may generate technical map 110A for model 106A that indicates which columns and/or rows or data values were used to generate prediction 108A. In an embodiment, technical map 110A may be generated responsive to a user request 120 for an understanding or breakdown of how prediction 109 was generated.

In 630, natural language translations are identified from a feature store, the natural language translations corresponding to at least a portion of the first subset of attributes used to generate the first prediction by the first machine model. For example, FIGS. 4A and 4B illustrate example embodiments of feature stores 414A and 414B (corresponding to feature store 114) for a dataset 312. Feature stores 414A, 414B may include new terminology or explanations of the data values or codes from dataset 312 (FIG. 3).

In 640, a natural language map of the first subset of attributes is generated based on the natural language translations. For example, at least a portion of the values of dataset 312, as used in a corresponding technical map (e.g., 510A, 510B) may include corresponding entries in a feature store 414A, 414B. MMS 102 may generate the corresponding natural language maps 516A, 516B based on combining technical maps 510A, 510B with the corresponding entries from feature stores 414A, 414B—which may include multiple entries depending on a role of a user 104. In an embodiment, MMS 102 may replace the codes of technical maps 510A, 510B with the corresponding the terminology from feature stores 414A, 414B.

In 650, the natural language map may be provided with the first prediction. For example, MMS 102 may provide NLM 111 for display on user device 118 with prediction 109. In some embodiments, the same feature store 114 may be used to generate natural language maps 116 across different data models 106 that refer back to the same dataset 112 for which feature store 114 was generated.

Figure 7:
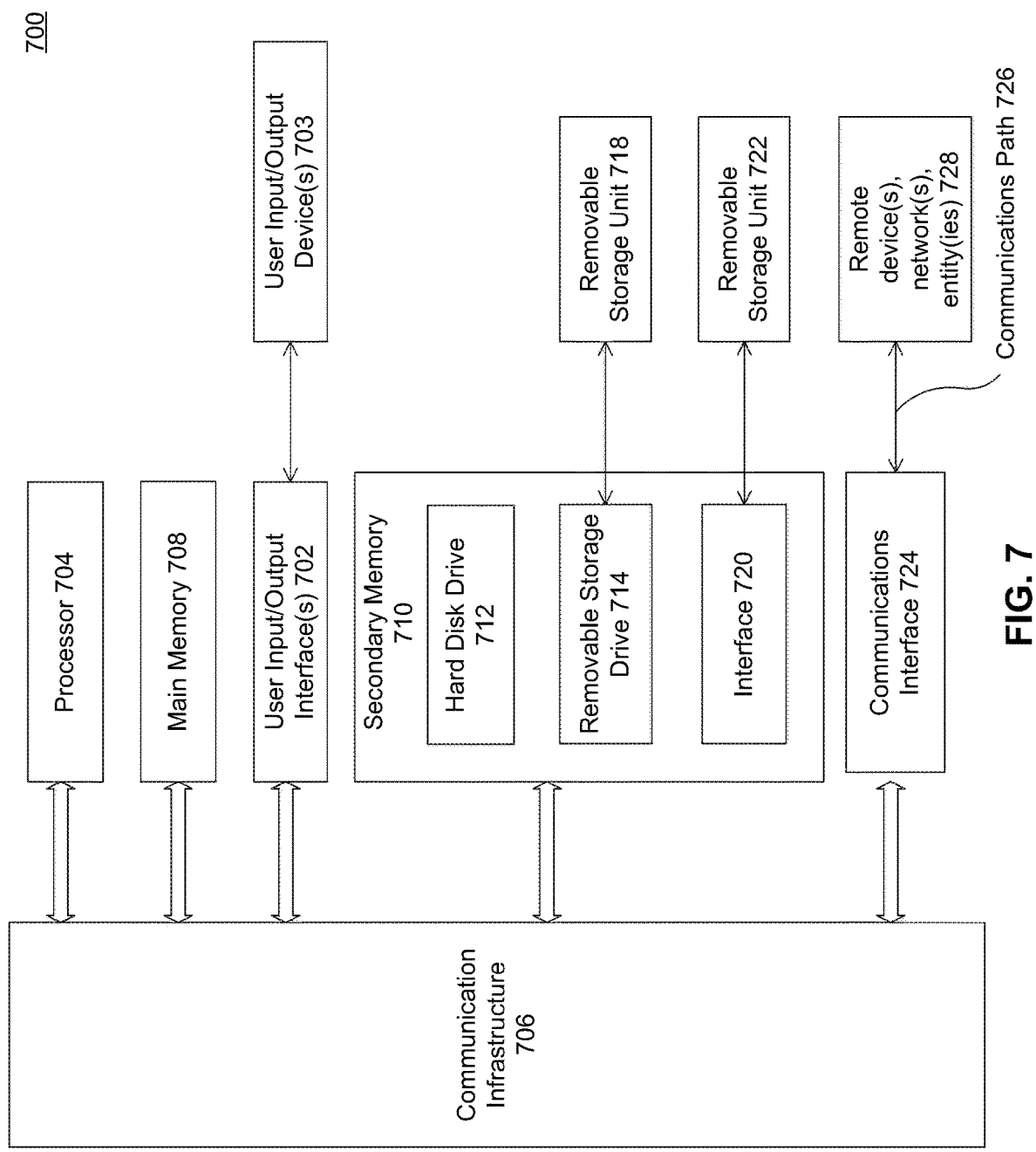
FIG. 7 is an example computer system useful for implementing various embodiments.

Various embodiments may be implemented, for example, using one or more well-known computer systems, such as computer system 700 shown in FIG. 7. One or more computer systems 700 may be used, for example, to implement any of the embodiments discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include customer input/output device(s) 703, such as monitors, keyboards, pointing devices, etc., which may communicate with communication infrastructure 706 through customer input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random-access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" and/or cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 7. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
    determining that a first prediction from a first machine model has been generated based on a dataset comprising a plurality of attributes;
    automatically generating, by at least one processor, a technical map identifying a first subset of attributes of the plurality of attributes used to generate the first prediction by the first machine model;
    identifying, from a feature store, natural language translations corresponding to at least a portion of the first subset of attributes used to generate the first prediction by the first machine model, wherein the natural language translations include one of new terminology or explanations corresponding to the portion of the first subset of attributes;
    automatically generating, by the at least one processor, a natural language map of the first subset of attributes based on the natural language translations, wherein the portion of the first subset of attributes have been replaced, on the technical map, with the corresponding new terminology or explanations from the feature store; and
    providing the natural language map with the first prediction.

2. The method of claim 1, further comprising:
    determining that a second prediction from a second machine model has been generated based on the dataset, wherein the second prediction is different from the first prediction, and wherein the second machine model is different from the first machine model; and
    automatically generating a second technical map identifying a second subset of attributes of the plurality of attributes used to generate the second prediction by the second machine model, wherein at least one attribute of the second subset of attributes is an identical attribute to at least one attribute of the first subset of attributes, and wherein the feature store includes a natural language translation of the identical attribute.

3. The method of claim 2, wherein the first machine model and the second machine model are both machine learning models.

4. The method of claim 1, wherein the dataset comprises one or more column codes corresponding to column names corresponding to columns of the dataset, and wherein the feature store includes natural language translations for each of the one or more column codes.

5. The method of claim 4, wherein the dataset comprises one or more data codes corresponding to data stored across a plurality of records of the dataset and in the one or more columns, and wherein the feature store includes natural language translations for each of the one or more data codes.

6. The method of claim 1, wherein the technical map includes a stemmed version of a first attribute from the first subset of attributes, wherein the stemmed version includes a shorter version of the first attribute relative to a longer version of the first attribute as it is stored in the dataset.

7. The method of claim 5, wherein the generating the natural language map comprises reverse mapping the stemmed version of the first attribute to the longer version of the first attribute as it is stored in the dataset, wherein the longer version is included in the natural language map.

8. The method of claim 6, wherein the stemmed version includes a single word, and wherein the longer version includes a plurality of words.

9. The method of claim 1, further comprising:
receiving a request from a user to generate the natural language map, wherein the generating the technical map and the generating the natural language map are both performed responsive to the request.

10. A system, comprising:
a memory; and
at least one processor coupled to the memory and configured to perform instructions that cause the at least one processor to perform operations comprising:
determining that a first prediction from a first machine model has been generated based on a dataset comprising a plurality of attributes;
automatically generating a technical map identifying a first subset of attributes of the plurality of attributes used to generate the first prediction by the first machine model;
identifying, from a feature store, natural language translations corresponding to at least a portion of the first subset of attributes used to generate the first prediction by the first machine model, wherein the natural language translations include one of new terminology or explanations corresponding to the portion of the first subset of attributes;
automatically generating a natural language map of the first subset of attributes based on the natural language translations, wherein the portion of the first subset of attributes have been replaced, on the technical map, with the corresponding new terminology or explanations from the feature store; and
providing the natural language map with the first prediction.

11. The system of claim 10, the operations further comprising:
determining that a second prediction from a second machine model has been generated based on the dataset, wherein the second prediction is different from the first prediction, and wherein the second machine model is different from the first machine model; and
automatically generating a second technical map identifying a second subset of attributes of the plurality of attributes used to generate the second prediction by the second machine model, wherein at least one attribute of the second subset of attributes is an identical attribute to at least one attribute of the first subset of attributes, wherein the feature store includes a natural language translation of the identical attribute, and wherein the first machine model and the second machine model are both machine learning models.

12. The system of claim 10, wherein the dataset comprises one or more column codes corresponding to column names corresponding to columns of the dataset, and wherein the feature store includes natural language translations for each of the one or more column codes.

13. The system of claim 12, wherein the dataset comprises one or more data codes corresponding to data stored across a plurality of records of the dataset and in the one or more columns, and wherein the feature store includes natural language translations for each of the one or more data codes.

14. The system of claim 10, wherein the technical map includes a stemmed version of a first attribute from the first subset of the plurality of attributes, wherein the stemmed version includes a shorter version of the first attribute relative to a longer version of the first attribute as it is stored in the dataset.

15. The system of claim 14, wherein the generating the natural language map comprises reverse mapping the stemmed version of the first attribute to the longer version of the first attribute as it is stored in the dataset, wherein the longer version is included in the natural language map.

16. The system of claim 15, wherein the stemmed version includes a single word, and wherein the longer version includes a plurality of words.

17. The system of claim 10, the operations further comprising:
receiving a request from a user to generate the natural language map, wherein the generating the technical map and the generating the natural language map are both performed responsive to the request.

18. A non-transitory computer-readable medium having instructions stored thereon that, when executed by at least one computing device, cause the at least one computing device to perform operations comprising:
determining that a first prediction from a first machine model has been generated based on a dataset comprising a plurality of attributes;
automatically generating a technical map identifying a first subset of attributes of the plurality of attributes used to generate the first prediction by the first machine model;
identifying, from a feature store, natural language translations corresponding to at least a portion of the first subset of attributes used to generate the first prediction by the first machine model, wherein the natural language translations include one of new terminology or explanations corresponding to the portion of the first subset of attributes;
automatically generating a natural language map of the first subset of attributes based on the natural language translations, wherein the portion of the first subset of attributes have been replaced, on the technical map, with the corresponding new terminology or explanations from the feature store; and
providing the natural language map with the first prediction.

19. The non-transitory computer-readable medium of claim 18, wherein the operations further comprise:
determining that a second prediction from a second machine model has been generated based on the dataset, wherein the second prediction is different from the first prediction, and wherein the second machine model is different from the first machine model; and
automatically generating a second technical map identifying a second subset of attributes of the plurality of attributes used to generate the second prediction by the second machine model, wherein at least one attribute of the second subset of attributes is an identical attribute to at least one attribute of the first subset of attributes, wherein the feature store includes a natural language translation of the identical attribute, and wherein the first machine model and the second machine model are both machine learning models.

20. The non-transitory computer-readable medium of claim 18, wherein the dataset comprises one or more column codes corresponding to column names corresponding to columns of the dataset, and wherein the feature store includes natural language translations for each of the one or more column codes.

* * * * *